United States Patent
Wiechers (10) Patent No.: US 11,423,350 B2
(45) Date of Patent: Aug. 23, 2022

(54) APPARATUS AND METHOD FOR FLEXIBLY COLLECTING AND/OR DELIVERING A SHIPMENT

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 404 days.

(21) Appl. No.: 15/864,682

(22) Filed: Jan. 8, 2018

(65) Prior Publication Data

US 2018/0144300 A1 May 24, 2018

Related U.S. Application Data

(63) Continuation of application No. PCT/EP2016/062919, filed on Jun. 7, 2016.

(30) Foreign Application Priority Data

Jul. 8, 2015 (DE) ..................... 10 2015 111 033.4

(51) Int. Cl.
*G06Q 10/08* (2012.01)
*G06Q 50/28* (2012.01)
(Continued)

(52) U.S. Cl.
CPC ......... *G06Q 10/0836* (2013.01); *B60R 25/01* (2013.01); *B60R 25/23* (2013.01); *G06Q 50/28* (2013.01); *G07F 17/13* (2020.05)

(58) Field of Classification Search
CPC ............. G06Q 10/083; G06Q 10/0833; G06Q 10/0835; G06Q 10/0836
(Continued)

(56) References Cited

U.S. PATENT DOCUMENTS 9,256,852 B1 * 2/2016 Myllymaki .......... G06Q 10/083
9,573,684 B2 * 2/2017 Kimchi ................. B64C 39/024
(Continued)

FOREIGN PATENT DOCUMENTS

CN 103999497 A 8/2014

OTHER PUBLICATIONS

Fieldlogix.com, "Will Phone GPS Tracking Help Drone Delivery?", available at: https://fieldlogix.com/news/drone-delivery-gps-tracking/, last accessed Mar. 30, 2022 (Year: 2015).*
(Continued)

*Primary Examiner* — Emmett K. Walsh
(74) *Attorney, Agent, or Firm* — Reinhart Boerner Van Deuren P.C.

(57) ABSTRACT

A method is disclosed that involves the following steps. A control apparatus of a vehicle is used to obtain a piece of collection and/or delivery position information for a collection/or delivery position for collecting and/or delivering a shipment. The collection and/or delivery position is at least partly dependent on a position of a shipment recipient and/or shipment deliverer. The control apparatus brings about the at least partly autonomous movement of the vehicle to the collection and/or delivery position. The control apparatus brings about the provision of the shipment for collection and/or the holding, for obtainment, of the shipment at the collection and/or delivery position by the vehicle.

23 Claims, 3 Drawing Sheets

(51) Int. Cl.
    *G07F 17/12*     (2006.01)
    *B60R 25/01*     (2013.01)
    *B60R 25/23*     (2013.01)

(58) Field of Classification Search
    USPC ........................................................ 705/339
    See application file for complete search history.

(56) References Cited

U.S. PATENT DOCUMENTS

| | | | |
|---|---|---|---|
| 10,198,749 B1* | 2/2019 | Haskin | G06Q 10/0837 |
| 2007/0150375 A1 | 6/2007 | Yang | |
| 2012/0030133 A1* | 2/2012 | Rademaker | G06Q 10/08 |
| | | | 705/333 |
| 2014/0032034 A1 | 1/2014 | Raptopoulos et al. | |
| 2014/0254896 A1 | 9/2014 | Zhou et al. | |
| 2014/0330456 A1* | 11/2014 | Lopez Morales | G05D 1/0022 |
| | | | 701/3 |
| 2015/0006005 A1† | 1/2015 | Yu | |
| 2015/0120094 A1 | 4/2015 | Kimchi et al. | |
| 2016/0016664 A1* | 1/2016 | Basuni | B64C 39/024 |
| | | | 244/17.13 |

OTHER PUBLICATIONS

Florian Rötzer, Telepolis, Are the Amazon drones a good idea?, Dec. 2, 2013, 8 pages URL: http://www.heise.de/tp/artikel/40/40475/1.html, Archiviert in www.archive.org am0.2014.

\* cited by examiner
† cited by third party

APPARATUS AND METHOD FOR FLEXIBLY COLLECTING AND/OR DELIVERING A SHIPMENT

CROSS-REFERENCE TO RELATED PATENT APPLICATIONS

This patent application is a continuation of PCT/EP2016/062919, filed Jun. 7, 2016, which claims priority to German Application No. 10 2015 111 033.4, filed Jul. 8, 2015, the entire teachings and disclosure of which are incorporated herein by reference thereto.

FIELD OF THE INVENTION

Exemplary embodiments of the invention relate to an apparatus and a method for flexibly collecting and/or delivering a shipment, to a computer program, to a vehicle and to a system.

BACKGROUND OF THE INVENTION

Stationary packing stations at which shipments can be collected by a shipment recipient and/or can be delivered by a shipment deliverer are known in the prior art. Although the flexibility and the convenience for the shipment recipient and/or the shipment deliverer are increased by these stationary packing stations in comparison with the collection and/or delivery at branches since the stationary packing stations also enable collection and/or delivery outside the branch opening hours, a shipment recipient must still collect the shipment intended for him at the packing station within a particular period, for example, since the shipment is not held there indefinitely. Accordingly, the collection and/or delivery of a shipment at a stationary packing station requires cooperation of the shipment recipient and/or shipment deliverer in order to avoid additional collection attempts and/or delivery attempts.

SUMMARY OF SOME EXEMPLARY EMBODIMENTS OF THE INVENTION

Therefore, the object of the present invention is, inter alia, to overcome these problems.

The invention discloses a method, the method comprising:
  obtaining, at a control apparatus of a vehicle, collection and/or delivery position information of a collection and/or delivery position for collecting and/or delivering a shipment, wherein the collection and/or delivery position is at least partially dependent on a position of a shipment recipient and/or shipment deliverer;
  causing, by the control apparatus, of at least partially autonomous moving of the vehicle to the collection and/or delivery position; and
  causing, by the control apparatus, of providing of the shipment for collection and/or of holding available for obtaining the shipment at the collection and/or delivery position by the vehicle.

For example, the method is used to flexibly collect and/or deliver a shipment.

For example, the method according to the invention is at least partially performed by the control apparatus and/or by respective means of the control apparatus, for example a control apparatus of the vehicle.

The invention discloses a control apparatus which comprises the following:

means configured to perform and/or control the method according to the invention or respective means for performing and/or controlling the steps of the method according to the invention (for example all steps which are not performed by a user).

For example, the apparatus is used to flexibly collect and/or deliver a shipment.

For example, the means of the control apparatus according to the invention are configured to perform and/or control the method according to the invention or its steps (for example apart from the steps which are performed by a user). One or more of the steps of the method according to the invention can also be performed and/or controlled by the same means. For example, one or more of the means of the control apparatus may be at least partially formed by one or more processors.

For example, the control apparatus according to the invention comprises at least one processor and at least one memory which contains program code, wherein the memory and the program code are configured to cause the control apparatus with the at least one processor to perform and/or control at least the method according to the invention. In this case, either all steps of the method according to the invention can be controlled or all steps of the method according to the invention can be performed or one or more steps can be controlled and one or more steps can be performed.

A processor is intended to be understood as meaning, for example, a control unit, a microprocessor, a microcontrol unit such as a microcontroller, a digital signal processor (DSP), an application-specific integrated circuit (ASIC) or a field-programmable gate array (FPGA).

For example, the control apparatus according to the invention is part of a vehicle, for example a control apparatus of the vehicle and/or a user apparatus of the vehicle (for example a navigation device for a vehicle, for example a permanently installed navigation device of a vehicle or a portable navigation device).

The invention discloses a vehicle which comprises the following:
  a control apparatus according to the invention.

The invention discloses a system which comprises the following:
  a vehicle according to the invention; and
  a mobile user apparatus.

The invention discloses a computer program which comprises the following: program instructions which cause a processor to perform and/or control the method according to the invention when the computer program runs on the processor.

The computer program according to the invention can be distributable, for example, via a network such as the Internet, a telephone or mobile radio network and/or a local area network. The computer program according to the invention may at least partially be software and/or firmware of a processor. It may likewise be at least partially implemented as hardware. The computer program according to the invention may be stored, for example, on a computer-readable storage medium, for example a tangible, magnetic, electrical, electromagnetic, optical and/or other storage medium. The storage medium may be, for example, part of the processor, for example a (non-volatile or volatile) program memory and/or main memory of the processor or part of the latter.

The properties of the method according to the invention, the control apparatus according to the invention, the vehicle according to the invention, the system according to the invention and the computer program according to the invention are described below—partially by way of example.

As disclosed above, the control apparatus according to the invention is a control apparatus for a vehicle, for example. The control apparatus is, for example, a control apparatus installed in the vehicle at the factory and controls a plurality of functions and/or means of the vehicle. However, it is also conceivable for the control apparatus to be retrofittable into the vehicle and to control, for example, only functions and means of the vehicle in connection with the method according to the invention.

Obtaining, at the control apparatus of the vehicle, collection and/or delivery position information of a collection and/or delivery position for collecting and/or delivering a shipment is intended to be understood as meaning, for example, that the collection and/or delivery position information is received by communication means of the control apparatus. For example, the collection and/or delivery position information is received at the control apparatus from a (for example remote) apparatus (for example a mobile user apparatus and/or a courier service apparatus).

A mobile user apparatus is, for example, a portable apparatus belonging to the shipment recipient and/or shipment deliverer, for example a mobile telephone (for example a smartphone), a personal digital assistant (PDA), a media playback device (for example an iPod), a user apparatus incorporated in an article of clothing (for example a "wearable" and/or a "connected wearable"), a notebook computer and/or a tablet computer.

A courier service apparatus is, for example, a server belonging to a courier service, for example a backend server belonging to the courier service. A courier service is, for example, a mail service, a parcel service and/or a messenger service.

For example, the control apparatus according to the invention comprises communication means. The communication means of the control apparatus according to the invention are configured, for example, to communicate with a (for example remote) apparatus (for example a mobile user apparatus and/or a courier service apparatus) indirectly (for example via communication means of the vehicle) and/or directly and to transmit and/or receive pieces of information (for example the collection and/or delivery position information).

An example of such communication means is a communication interface. For example, the communication means of the control apparatus according to the invention comprise a communication interface of a wireless and/or wired communication technology.

An example of a wireless communication technology is a local radio network technology such as Radio Frequency Identification (RFID) and/or Near Field Communication (NFC) and/or Bluetooth (for example Bluetooth Version 2.1 and/or 4.0) and/or Wireless Local Area Network (WLAN). RFID and NFC are specified, for example, according to the ISO standards 18000, 11784/11785 and the ISO/IEC standards 14443-A and 15693. The Bluetooth specifications are currently available on the Internet at www[dot]Bluetooth[dot]org. WLAN is specified, for example, in the standards of the IEEE 802.11 family. A further example of a wireless communication technology is a regional radio network technology, for example a mobile radio technology, for example Global System for Mobile Communications (GSM) and/or Universal Mobile Telecommunications System (UMTS) and/or Long Term Evolution (LTE). The GSM, UMTS and LTE specifications are maintained and developed by the 3rd Generation Partnership Project (3GPP) and are currently available on the Internet, inter alia, at www[dot]3gpp[dot]com.

Alternatively or additionally, the communication means of the control apparatus according to the invention are configured, for example, to communicate with the vehicle and/or with means of the vehicle. For example, the communication means of the control apparatus according to the invention comprise a vehicle interface such as an interface of a vehicle bus and/or a vehicle diagnostic interface. The control apparatus according to the invention is connectable to the vehicle and/or to means of the vehicle (for example to communication means of the vehicle), for example, via such a vehicle interface. One example of a vehicle bus is a Controller Area Network bus (CAN bus), a K-line bus, an L-line bus and/or an IDB-1394 bus. One example of a vehicle diagnostic interface is a K-line interface, an L-line interface and/or an on-board diagnostic interface (OBD interface).

Alternatively or additionally, the collection and/or delivery position information may also be obtained at the control apparatus, for example, as the result of determining the collection and/or delivery position by the control apparatus.

The collection and/or delivery position information comprises, for example, a position specification and/or coordinate specification of the collection and/or delivery position information. Collection and/or delivery position information further comprises, for example, an identifier which is assignable to the collection and/or delivery of the shipment, for example an identifier of the shipment, of the recipient/sender of the shipment.

The collection and/or delivery position is at least partially dependent on a position of a shipment recipient and/or shipment deliverer. For example, the collection and/or delivery position is determined at least partially in dependence on the position of the shipment recipient and/or shipment deliverer. In this case, the position of the shipment recipient and/or shipment deliverer is intended to be understood as meaning, for example, the position of a mobile user apparatus belonging to the shipment recipient and/or shipment deliverer. For example, the shipment recipient and/or shipment deliverer can cause the stipulation of the collection and/or delivery position by a corresponding input on a mobile user apparatus when he is at or in the vicinity of the desired collection and/or delivery position. In this example, the mobile user apparatus determines, for example, the position of the mobile user apparatus and communicates the corresponding position information (for example as collection and/or delivery position information) to the control apparatus according to the invention and/or to a courier service apparatus. Alternatively or additionally, the mobile user apparatus can determine the position of the mobile user apparatus at regular and/or irregular and can communicate the corresponding position information (for example as collection and/or delivery position information) to the control apparatus according to the invention and/or to a courier service apparatus.

This has the effect that the collection and/or delivery position can be determined and changed in a very flexible manner. Accordingly, the collection and/or delivery can be flexibly arranged and/or planned. As a result, the shipment can be delivered to the shipment recipient at or in the vicinity of a position at which he is (for example currently) situated. The shipment deliverer can deliver the shipment at or in the vicinity of such a position. Cooperation of the shipment recipient and/or shipment deliverer (such as for example in the case of a collection and/or delivery at a collection and/or delivery position predetermined by the courier service) is not required for this purpose, for example. This achieves, inter alia, the situation in which the shipment recipient and/or shipment deliverer can also actually reach the collection and/or delivery position, thus avoiding additional collection attempts and/or delivery attempts (for example on account of the failure of the shipment recipient and/or shipment deliverer to appear at the collection and/or delivery position). Furthermore, as a result, the shipment recipient and/or shipment deliverer is/are spared additional journeys (such as for example in the case of a collection and/or delivery at a collection and/or delivery position predetermined by the courier service) for collecting the shipment and/or delivering the shipment.

The causing of at least partially autonomous moving of the vehicle to the collection and/or delivery position is intended to be understood as meaning, for example, that the control apparatus transmits a corresponding control signal in order to cause the vehicle to move to the collection and/or delivery position in an at least partially autonomous manner.

The vehicle is, for example, an at least partially autonomously driving land vehicle (for example a rail vehicle, a truck and/or an automobile), an at least partially autonomously moving watercraft (for example a cargo ship) and/or an at least partially autonomously flying aircraft (for example a transport drone). This is advantageous, for example, in order to make it possible to collect and/or deliver the shipment (for example at least by the courier service) in an at least partially automated manner.

The vehicle is intended to be understood as at least partially autonomously moving, for example, when the vehicle moves (for example drives and/or flies) automatically (for example without the influence of a vehicle driver) at least on one part of a predetermined route and navigates along the predetermined route. It is also conceivable for the vehicle to move (for example drive and/or fly) automatically (for example without the influence of a vehicle driver) on the entire route and to navigate along the predetermined route. For example, the vehicle and/or means of the vehicle are configured to move the vehicle at least partially autonomously along a route predetermined by navigation means of the vehicle, for example to move (for example drive and/or fly) the vehicle automatically (for example without the influence of a vehicle driver) on a part of the route predetermined by navigation means of the vehicle and to navigate (for example steer) the vehicle along the predetermined route. Accordingly, the control apparatus can transmit, for example, a control signal to the navigation means of the vehicle in order to cause the collection and/or delivery position to be taken into account as the target position or intermediate target position on the route predetermined by the navigation means of the vehicle and to cause the vehicle to move at least partially autonomously to the collection and/or delivery position. As a result, the arrangement and/or planning of the collection and/or delivery of the shipment is automated, for example, and takes place, in particular, without the influence of a vehicle driver of the vehicle.

For example, the vehicle driver monitors only the automatic movement and navigation of the vehicle on that part of the route on which the vehicle moves and navigates automatically, for example. Alternatively, the vehicle may also be unmanned (for example at least on this part of the route), for example. That part of the route on which the vehicle moves and navigates automatically, for example, can be restricted, for example, to particular regions in which such automatic movement and/or navigation is possible. These may be, for example, regions having technical apparatuses (for example position transmitters, navigation markings, etc.) which are required for automatic movement and/or navigation of the vehicle. For land vehicles such as automobiles and trucks, these regions may be restricted, for example, to particular road sections and/or road types (for example freeways, main roads, country roads, county roads, urban roads, etc.). That part of the route on which the vehicle moves and navigates automatically can also be restricted to particular movement and navigation operations, for example. For land vehicles such as automobiles and trucks, these movement and navigation operations may be, for example, operations of driving into and/or driving out of a parking space, freeway journeys, etc.

Causing of providing of the shipment for collection and/or of holding available for obtaining the shipment at the collection and/or delivery position by the vehicle is intended to be understood as meaning, for example, that the control apparatus transmits a corresponding control signal in order to cause the shipment to be provided for collection and/or to be able to be obtained by the vehicle and/or means of the vehicle. This also achieves at least partial automation of the collection and/or delivery.

The shipment is considered to have been provided for collection, for example, if it can be received from the vehicle and/or means of the vehicle by the shipment recipient. The shipment can be delivered, for example, when it can be received by the vehicle and/or means of the vehicle.

For example, the shipment is considered to have been provided for collection if it is removable from a receiving compartment of the vehicle (for example is removed by a user such as the shipment recipient) and/or if it is dispensable by dispensing means of the vehicle (for example is dispensed by the dispensing means). Accordingly, the vehicle holds the shipment for obtaining, for example, when it is insertable into a receiving compartment of the vehicle (for example is inserted by a user such as the shipment deliverer) and/or if it is receivable by receiving means of the vehicle (for example is received by the receiving means).

One example of dispensing and/or receiving means of the vehicle is, for example, a gripping arm for gripping the shipment and/or a conveyor belt for conveying the shipment.

One example of a receiving compartment of the vehicle is, for example, a compartment which is accessible through a housing and/or body opening of the vehicle and is configured to receive the shipment. The housing and/or body opening is closable, for example, by a door which is lockable by locking means. In this example, the control apparatus actuates the locking means, for example, in order to cause the door to be unlocked and the shipment to be provided for collection and/or the shipment to be able to be obtained and/or to be obtained for delivery.

A shipment is, for example, a package, piece goods, a parcel shipment and/or a mail shipment.

Further advantages of the disclosed invention are described below on the basis of exemplary embodiments of the method, the control apparatus, the vehicle, the system and the computer program, the disclosure of which is intended to equally apply to the respective categories (method, apparatus, system, computer program).

According to one exemplary embodiment of the invention, the method further comprises determining the collection and/or delivery position at least partially in dependence on the position of the shipment recipient and/or shipment deliverer (for example the current and/or last known position of the shipment recipient and/or shipment deliverer), wherein the collection and/or delivery position information of the collection and/or delivery position is obtained as result of the determining. As described above, this is advantageous, for example, in order to make it possible to flexibly determine and change the collection and/or delivery position.

For example, not every position is suitable as a collection and/or delivery position. If the vehicle is a land vehicle such as an automobile or a truck, only positions on a road (for example in a parking and/or stopping area) are determinable as the collection and/or delivery position, for example. Corresponding restrictions may also emerge for rail vehicles, aircraft and watercraft.

For example, the collection and/or delivery position is determined such that it is within a predetermined distance from the position of the shipment recipient and/or shipment deliverer. The predetermined distance is, for example, shorter than 3 km, preferably shorter than 1 km, particularly preferably shorter than 500 m. Accordingly, the determined collection and/or delivery position is, for example, in a radius of less than 3 km, preferably less than 1 km, particularly preferably less than 500 m, around the position of the shipment recipient and/or shipment deliverer.

Alternatively or additionally, the collection and/or delivery position is determined, for example, such that it is within a shortest possible distance from the position of the shipment recipient and/or shipment deliverer. For example, the determined collection and/or delivery position is at the shortest possible distance from the position of the shipment recipient and/or shipment deliverer.

Furthermore, it is also possible for the collection and/or delivery position to be determined at least partially in dependence on the position of the shipment recipient and/or shipment deliverer and positions of further shipment recipients and/or shipment deliverers. For example, the collection and/or delivery position is determined such that it is within a shortest possible distance from each of these positions and/or within a predetermined distance (for example 3 km, preferably 1 km, particularly preferably 500 m) from each of these positions. This is advantageous, for example, in order to make it possible to collect and/or deliver a plurality of shipments at the collection and/or delivery position.

As described above, the position of the shipment recipient and/or shipment deliverer is intended to be understood in this case as meaning, for example, the position of a mobile user apparatus (for example the current position and/or the position of the mobile user apparatus last determined by positioning means) belonging to the shipment recipient and/or shipment deliverer. This has the effect, for example, that the position of the shipment recipient and/or shipment deliverer can be determined, for example, using means of the mobile user apparatus (for example positioning means such as a sensor of a satellite navigation system).

The determining is carried out, for example, by the control apparatus. For example, the mobile user apparatus communicates pieces of position information of a position of the mobile user apparatus (for example the current position of the mobile user apparatus) to the control apparatus and the control apparatus receives these pieces of position information.

Alternatively or additionally, the determining is carried out, for example, the mobile user apparatus. For example, the mobile user apparatus communicates the collection and/or delivery position information to the control apparatus.

Alternatively or additionally, the determining is carried out, for example, by a courier service apparatus. For example, the mobile user apparatus communicates pieces of position information of a position of the mobile user apparatus (for example the current position of the mobile user apparatus) to the courier service apparatus and the courier service apparatus receives these pieces of position information. The courier service apparatus then determines the collection and/or delivery position and communicates the collection and/or delivery position information to the control apparatus.

For example, the collection and/or delivery position is at least partially determined again in dependence on the position of the shipment recipient and/or shipment deliverer if the position of the shipment recipient and/or shipment deliverer changes, for example if the position of the shipment recipient and/or shipment deliverer changes substantially. A substantial change in the position of the shipment recipient and/or shipment deliverer is present, for example, if the position of the shipment recipient and/or shipment deliverer changes by more than a predetermined distance, for example changes by more than 3 km, preferably more than 1 km, particularly preferably more than 500 m. This is advantageous, for example, in order to be able to adapt the collection and/or delivery position if the position of the shipment recipient and/or shipment deliverer changes. As a result, additional collection attempts and/or delivery attempts can be avoided. Cooperation of the shipment recipient and/or shipment deliverer (for example during a collection and/or delivery at a collection and/or delivery position predetermined by the courier service) is not required for this purpose, for example.

Alternatively or additionally, the collection and/or delivery position is at least partially determined again in dependence on the position of the shipment recipient and/or shipment deliverer if the position of the shipment recipient and/or shipment deliverer changes such that the previously determined collection and/or delivery position is outside a predetermined from the (changed) position of the shipment recipient and/or shipment deliverer. As described above, the predetermined distance is, for example, shorter than 3 km, preferably shorter than 1 km, particularly preferably shorter than 500 m. This is also advantageous, for example, in order to be able to adapt the collection and/or delivery position if the position of the shipment recipient and/or shipment deliverer changes.

According to one exemplary embodiment of the invention, the method further comprises obtaining, at the control apparatus, collection and/or delivery time information for collecting and/or delivering the shipment, and causing, by the control apparatus, of at least partially autonomous moving of the vehicle to the collection and/or delivery position at least partially in dependence on the obtained collection and/or delivery time information. This is advantageous, for example, in order to also be able to take into account, in addition to the (spatial) position of the shipment recipient and/or shipment deliverer, a temporal component, for example the temporal availability of the shipment recipient and/or shipment deliverer at this position, when arranging and/or planning the collection and/or delivery.

Obtaining, at the control apparatus of the vehicle, collection and/or delivery position information collection and/or delivery time information for collecting and/or delivering the shipment is intended to be understood as meaning, for example, that the collection and/or delivery time information is received by communication means of the control apparatus. For example, the collection and/or delivery time information is communicated by a (for example remote) apparatus (for example a mobile user apparatus and/or a courier service apparatus) to the control apparatus.

Causing of at least partially autonomous moving of the vehicle to the collection and/or delivery position at least partially in dependence on the obtained collection and/or delivery time information is intended to be understood as meaning, for example, that the control apparatus transmits a corresponding control signal in order to cause the vehicle to move to the collection and/or delivery position in an at least partially autonomous manner and at least partially in dependence on the obtained collection and/or delivery time information.

For example, the collection and/or delivery time information comprises collection and/or delivery period information and/or collection and/or delivery date information for collecting and/or delivering the shipment. Collection and/or delivery period information specifies, for example, a collection and/or delivery period for collecting and/or delivering the shipment. Collection and/or delivery date information specifies, for example, a collection and/or delivery date for collecting and/or delivering the shipment, for example the latest possible date for collecting and/or delivering the shipment at the collection and/or delivery position. Accordingly, the control apparatus causes, for example, the vehicle to move to the collection and/or delivery position in an at least partially autonomous manner in such a way that it is at the collection and/or delivery position (for example at the latest) at the collection and/or delivery date or is at least temporarily at the collection and/or delivery position in the collection and/or delivery period.

For example, in addition to causing the stipulation of the collection and/or delivery position, the shipment recipient and/or shipment deliverer can also cause the stipulation of the collection and/or delivery date or the collection and/or delivery period by a corresponding input on a mobile user apparatus.

For example, the shipment recipient and/or shipment deliverer can indicate how long he will stay at a particular position and can receive or deliver the shipment at this position. For example, the mobile user apparatus communicates the corresponding time information (for example as collection and/or delivery time information) to the control apparatus and/or a courier service apparatus.

As described above, the vehicle and/or means of the vehicle is/are configured to move the vehicle in an at least partially autonomous manner along a route predetermined by navigation means of the vehicle, for example to move (for example drive and/or fly) the vehicle automatically (for example without the influence of a vehicle driver) on a part of the route predetermined by navigation means of the vehicle and to navigate (for example steer) the vehicle along the predetermined route. Accordingly, the control apparatus can transmit, for example, a control signal to the navigation means of the vehicle in order to cause the collection and/or delivery period information to be taken into account for the route predetermined by the navigation means of the vehicle and to cause the vehicle to move to the collection and/or delivery position in an at least partially autonomous manner and at least partially in dependence on the obtained collection and/or delivery time information. For example, the navigation means take into account the collection and/or delivery date as the arrival date and/or the collection and/or delivery period as the arrival period for the arrival of the vehicle at the collection and/or delivery position taken into account as the target position or intermediate target position on the route predetermined by the navigation means of the vehicle.

According to one exemplary embodiment of the invention, the method further comprises notifying and/or causing notifying of the shipment recipient and/or shipment deliverer when the vehicle is at and/or in the vicinity of the collection and/or delivery position. For example, the control apparatus communicates a corresponding notification to a mobile user apparatus belonging to the shipment recipient and/or shipment deliverer or causes communication of such a notification when the vehicle is at and/or in the vicinity of the collection and/or delivery position.

The vehicle is, for example, in the vicinity of the collection and/or delivery position when it is within a predetermined distance (for example 3 km, preferably 1 km, particularly preferably 500 m) from the collection and/or delivery position and/or presumably reaches and/or will reach the collection and/or delivery position in a predetermined time (for example in 3 minutes, preferably in 10 minutes, particularly preferably in 15 minutes). The control apparatus can request and/or obtain corresponding pieces of information from the navigation means of the vehicle, for example. This is advantageous, for example, in order to shorten the residence time/waiting time of the vehicle at the collection and/or delivery position.

According to one exemplary embodiment of the invention, the causing of the providing of the shipment and/or of the obtaining of the shipment comprises obtaining, at the control apparatus, access authorization information, and causing, by the control apparatus, of unlocking of a door of the vehicle at least partially in dependence on the obtained access authorization information.

The access authorization information can be obtained at the control apparatus, for example, by capturing a user input by the shipment recipient and/or shipment deliverer on user input means. For example, the control apparatus according to the invention comprises corresponding user input means (for example a keyboard, a touch-sensitive screen such as a touch display, a microphone and/or a camera). However, the user input means may also be separate from the control apparatus.

Alternatively or additionally, the access authorization information can be obtained at the control apparatus, for example, by receiving the access authorization information at the control apparatus. For example, the access authorization information is communicated from a mobile user apparatus belonging to the shipment recipient and/or shipment deliverer to the control apparatus. As disclosed above, the control apparatus may comprise corresponding communication means.

Causing of unlocking of the door of the vehicle at least partially in dependence on the obtained access authorization information by the control apparatus is intended to be understood as meaning, for example, that the unlocking of the door of the vehicle is caused at least partially in response to the obtaining of the access authorization information.

The door is closes, for example, a housing and/or body opening of the vehicle, through which a receiving compartment of the vehicle is accessible. For example, the control apparatus is configured to transmit a control signal to locking means of the door in order to cause unlocking and/or opening of the door, for example, in order to make it possible to access the receiving compartment of the vehicle. Accordingly, causing of unlocking of the door of the vehicle is intended to be understood as meaning, for example, the actuating of the locking means of the door by the control apparatus in order to cause of the door by the locking means of the door.

One example of locking means of the door is an electronically actuatable lock and/or an electronically actuatable locking unit. For example, the control means of the control apparatus are configured to control such a lock and therefore to be able to cause, for example, opening of the lock (that is to say unlocking of the door) and/or closing of the lock (that is to say locking of the door). It is conceivable, for example, for the control apparatus to comprise the locking means. However, the locking means of the door may also be separate from the control apparatus according to the invention.

For example, the causing of the providing of the shipment and/or of the obtaining of the shipment further comprises deciding whether access is grantable for collecting the shipment and/or delivering the shipment at least partially in dependence on the obtained access authorization information, and causing of unlocking of the door of the vehicle only when it has been decided that access is grantable. This is advantageous, for example, in order to ensure that only the shipment recipient obtains access to the receiving compartment in which a shipment for the shipment recipient is situated and/or in order to prevent unauthorized persons obtaining access to the receiving compartment.

Deciding whether access is grantable is intended to be understood as meaning, for example, that a check is carried out in order to determine whether the obtained access authorization information authorizes access (for example by the control apparatus). For example, the control apparatus comprises checking means which are configured to check whether the obtained access authorization information authorizes access.

For example, the access authorization information authorizes access for collecting the shipment and/or delivering the shipment.

The access authorization information contains, for example, one or more access authorization parameters. These may, for example, a (in particular unique) identifier for the control apparatus and/or the vehicle, a (in particular unique) identifier for the access authorization information itself, pieces of temporal validity information (for example in the form of a "not before date", a "not after date", a "starting time of the day" and an "end time of the day" which indicate within which days and within which time of day access can be granted, for example from 27.3.2014 00:00:00 to 28.3.2014 23:59:59), spatial validity information (for example in the form of a radius around a collection and/or delivery position in which access can be granted), an upper limit of the permitted usages of the access authorization information to obtain access, and information of the extent to which access can be granted (that is to say, for example, whether all doors of a vehicle can be opened or only one door or a particular group).

At least one predefined set (for example all or only some) of the access authorization parameters is checked, with respect to respective pieces of reference information, in order to determine whether said parameters each authorize access.

For example, the identifier for the control apparatus can be checked, as an access authorization parameter, with respect to an identifier of the control apparatus stored in the control apparatus and, if there is a match, it can be determined that this access authorization parameter authorizes access. This is advantageous, for example, if the control apparatus is a control apparatus from a plurality of control apparatuses in order to ensure that the access authorization information only authorizes access with respect to the control apparatus with the corresponding identifier.

Access is therefore granted, for example, if it has been determined, for at least one particular set of the access authorization parameters, that said parameters authorize access with respect to their respective reference information in the control apparatus. If it is decided that access can be granted, a corresponding control signal, for example, is output, for example to the locking means (for example the lock). Otherwise, an optical and/or acoustic alarm and/or a warning is/are output, for example, and/or corresponding information is communicated to a courier service apparatus.

For example, access is granted by causing of unlocking of the at least one door of the vehicle (for example by the control apparatus). As described above, the control means of the control apparatus may be configured to control a lock of the door and therefore to be able to cause, for example, opening of the lock (that is to say unlocking of the door) and/or closing of the lock (that is to say locking of the door).

According to one exemplary embodiment of the invention, the vehicle comprises one or more receiving compartments for receiving one or more shipments. For example, each of the receiving compartments is accessible through a respective body and/or housing opening of the vehicle which is closable by a respective lockable door. For example, the control apparatus is configured to actuate locking means of each of the doors in order to cause unlocking of the respective door. This is advantageous, for example, so that the vehicle on a route can simultaneously deliver (for example can provide for collection) and/or obtain more than one shipment. As described above, the lockable doors make it possible to ensure, for example, that only the shipment recipient obtains access to the receiving compartment in which a shipment for the shipment recipient is situated.

The receiving compartments have different dimensions, for example. Alternatively, the receiving compartments have the same dimensions. For example, the dimensions (width× depth×height) of at least one receiving compartment (for example of all receiving compartments) of the receiving compartments are not greater than 75 cm×75 cm×75 cm, preferably not greater than 50 cm×50 cm×50 cm, particularly preferably not greater than 30 cm×30 cm×30 cm. The size of the receiving compartments advantageously corresponds to the most conventional size and/or the most conventional sizes of a shipment in order to be able to use the space in the vehicle as optimally as possible.

According to one exemplary embodiment of the invention, the vehicle comprises one or more cubicles. The cubicles are, for example, changing cubicles. For example, each of the cubicles is accessible through a respective body and/or housing opening of the vehicle which is closable by a respective lockable door. For example, the control apparatus is configured to actuate locking means of each of the doors in order to cause unlocking of the respective door.

The cubicles have different dimensions, for example. Alternatively, the cubicles have the same dimensions. For example, the dimensions (width×depth×height) of at least one cubicle (for example of all cubicles) of the cubicles are not greater than 100 cm×100 cm×230 cm, preferably not greater than 90 cm×90 cm×230 cm, particularly preferably not greater than 80 cm×80 cm×230 cm.

This is advantageous, for example, in order to make it possible for the shipment recipient to immediately try on clothing contained in the shipment and possibly to deliver it again as a return shipment.

According to one exemplary embodiment of the invention, the vehicle comprises one or more user terminals. The user terminals are used, for example, to undertake payment operations, courier operations and/or delivery operations with a user. For example, the user terminals are as a data processing apparatus with user input means (for example a keyboard, a touch-sensitive screen such as a touch display, a microphone, a camera, etc.) and user output means (for example a screen, a loudspeaker, etc.). For example, the user terminals are formed as self-service terminals.

According to one exemplary embodiment of the invention, the vehicle is an autonomously driving vehicle.

According to one exemplary embodiment of the invention, the vehicle is at least partially solar-powered.

According to one exemplary embodiment of the invention, the system further comprises a courier service apparatus. The courier service apparatus is, for example, a server (for example a backend server) belonging to a courier service which, for example, monitors and/or supports and/or arranges and/or plans the proper sequence of one or more collections/deliveries.

Further advantageous exemplary configurations of the invention can be gathered from the following detailed description of some exemplary embodiments of the present invention, in particular in conjunction with the figures. However, the figures accompanying the application are intended to be used only for the purpose of illustration, but not to determine the scope of protection of the invention. The accompanying drawings are not necessarily true to scale and are intended only to reflect, for example, the general concept of the present invention. In particular, features which are included in the figures are not intended in any way to be considered a necessary part of the present invention.

DETAILED DESCRIPTION OF THE INVENTION

Figure 1:
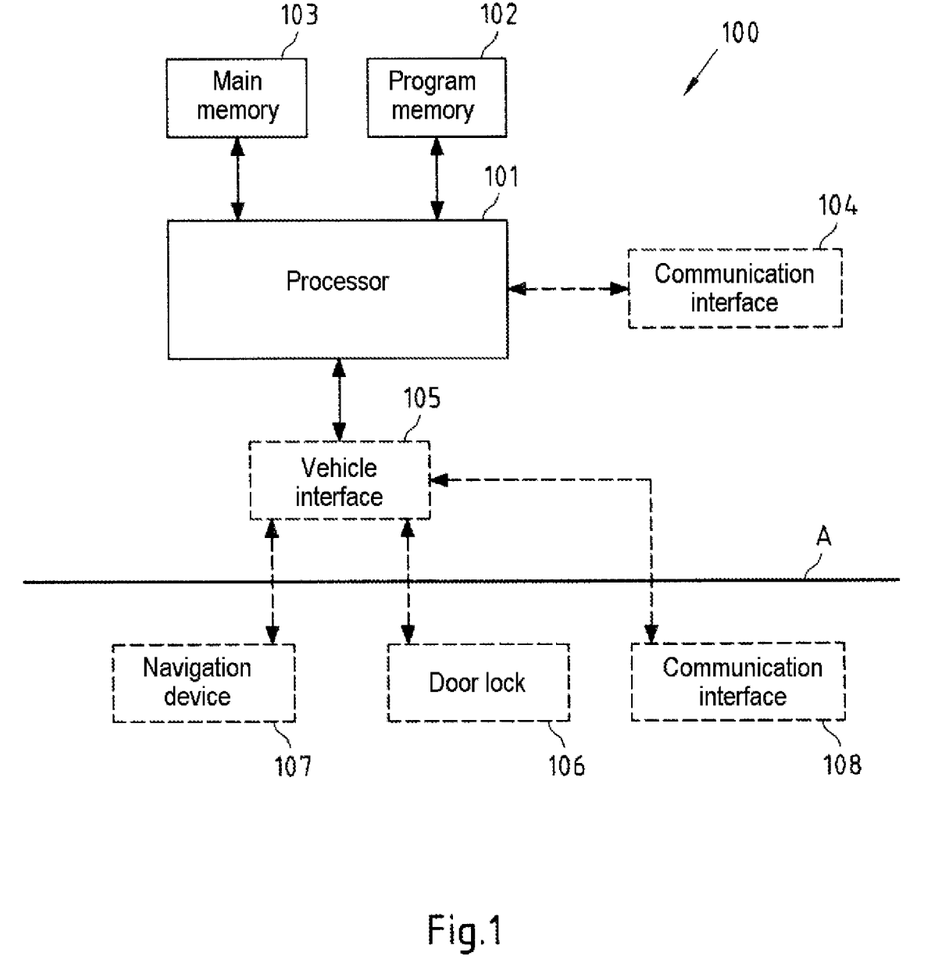
FIG. 1 shows a block diagram of the electronic components of an exemplary embodiment of a control apparatus according to the invention.

FIG. 1 is a block diagram of an exemplary embodiment of the control apparatus 100 according to the invention.

Processor 101 of the control apparatus 100 is, in particular, in the form of a microcontroller or microprocessor. Processor 101 executes program instructions stored in program memory 102 and stores, for example, intermediate results or the like in main memory 103. For example, program memory 102 is a non-volatile memory such as a flash memory, a magnetic memory, an EEPROM memory, a persistent memory such as a ROM memory and/or an optical memory. Main memory 103 is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Program memory 102 and main memory 103 are preferably arranged together with processor 101 in a module.

Figure 3:
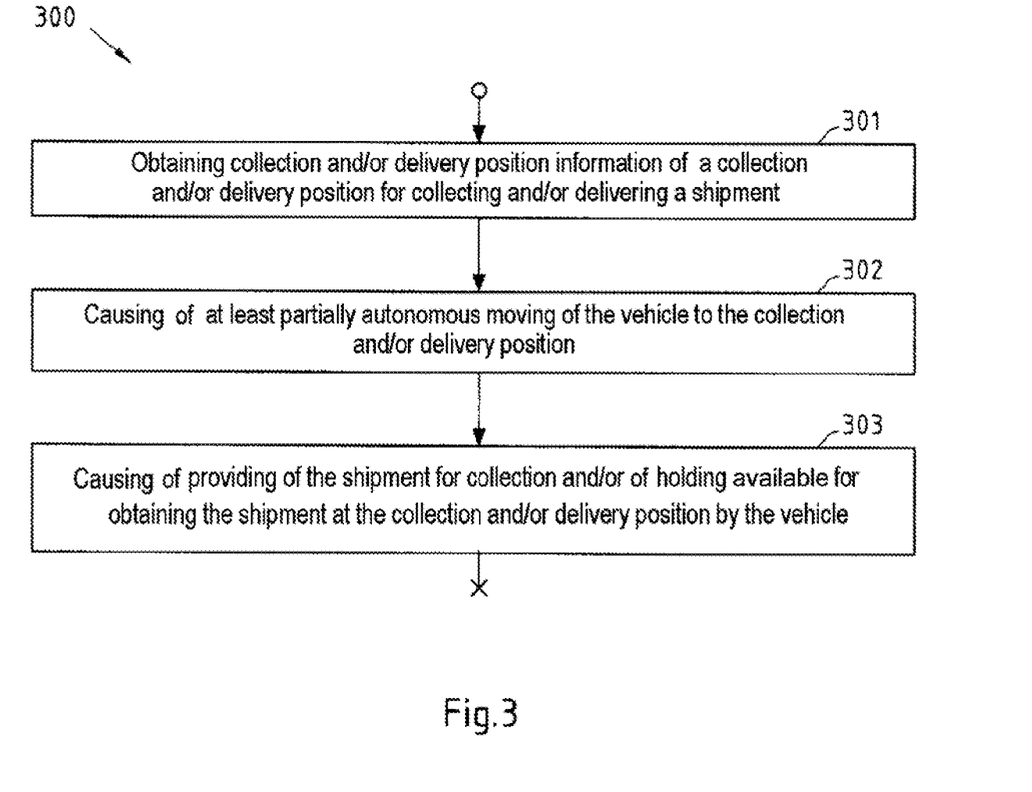
FIG. 3 shows a flowchart of an example of a method according to the invention.

Program memory 102 stores, for example, program instructions which cause the processor 101, when it executes the program instructions, to at least partially perform and/or control the method illustrated in FIG. 3.

The optional wireless communication interface 104 is configured, for example, to communicate according to one or more wireless communication technologies. It is assumed below, for example, that the wireless communication interface 104 supports communication via a local radio network and a mobile radio network. For example, the wireless communication interface 104 is at least partially formed by a transceiver of the local radio network technology, a transceiver of the mobile radio technology and one or more antennas. As disclosed above, one example of a local radio network technology is RFID, NFC, Bluetooth and/or WLAN; and one example of a mobile radio technology is GSM, UMTS and/or LTE. The wireless communication interface 104 can optionally support only one of these wireless communication technologies or can support further wireless communication technologies.

The processor 101 can communicate with other apparatuses, such as a courier service apparatus and/or a mobile user apparatus, via the wireless communication interface 104, for example. Processor 101 is operatively connected, for example, to the wireless communication interface 104 (for example via a bus). For example, the wireless communication interface 104 can receive or request pieces of information from other apparatuses and can forward them to processor 101 and/or can receive pieces of information from processor 101 and can transmit them to other apparatuses. For example, processor 101 at least partially controls the communication interface 104.

Processor 101 is further connectable to means of a vehicle (for example of the vehicle 10 in FIG. 2) via the optional vehicle interface 105. The vehicle interface 105 is, for example, a vehicle diagnostic interface and/or an interface of a vehicle bus. Processor 101 is operatively connected, for example, to vehicle interface 105 (for example via a bus). For example, the vehicle interface 105 is configured to be connected to a corresponding interface of a vehicle bus of a vehicle and to communicate with means of the vehicle (for example door lock 106, navigation device 107 and/or wireless communication interface 108) via the vehicle bus. For example, the vehicle interface 105 can receive or request pieces of information from means of the vehicle (for example door lock 106, navigation device 107 and/or wireless communication interface 108) and can forward them to processor 101 and/or can receive pieces of information from processor 101 and can forward them to means of the vehicle (for example door lock 106, navigation device 107 and/or wireless communication interface 108). For example, processor 101 at least partially controls the vehicle interface 105.

The optional door lock 106, the optional navigation device 107 and the optional wireless communication interface 108 are not part of the control apparatus 100, but rather part of the vehicle (for example of the vehicle 10 in FIG. 2), for example. The boundary between the control apparatus 100 and the vehicle is indicated in FIG. 1 by the line A running above the door lock 106, the navigation device 107 and the wireless communication interface 108. The processor 101 can communicate with the door lock 106, the navigation device 107 and the wireless communication interface 108 via the vehicle interface 105 and can at least partially control these means of the vehicle via the vehicle interface 105.

The door lock 106 is, for example, an electronically actuatable lock. The door lock 106 is, for example, a lock of a door of the vehicle (for example of the door 11 of the vehicle 10 in FIG. 2). In addition to door lock 106, the processor 101 can be connected to further door locks of the vehicle via the vehicle interface 105.

For example, the optional navigation device 107 is configured to predetermine a route for the vehicle, for example taking into account a collection and/or delivery position as the target position or intermediate target position on the route predetermined by the navigation device.

The optional wireless communication interface 108 is configured, for example, like the optional communication interface 104 and supports communication via a local radio network and a mobile radio network. Optionally, the wireless communication interface 108 may support only one of these wireless communication technologies or may support further wireless communication technologies.

The processor 101 is operatively connected to the wireless communication interface 108, for example via the vehicle interface 105. The processor 101 can communicate with other apparatuses, for example via the wireless communication interface 108. For example, the wireless communication interface 108 can receive or request pieces of information from other apparatuses and can forward them to processor 101 via the vehicle interface 105 and/or can receive pieces of information from processor 101 via the vehicle interface 105 and can transmit them to other apparatuses. For example, processor 101 at least partially controls the communication interface 108. The wireless communication interface 108 may be provided as an alternative or in addition to the wireless communication interface 104.

Figure 2:
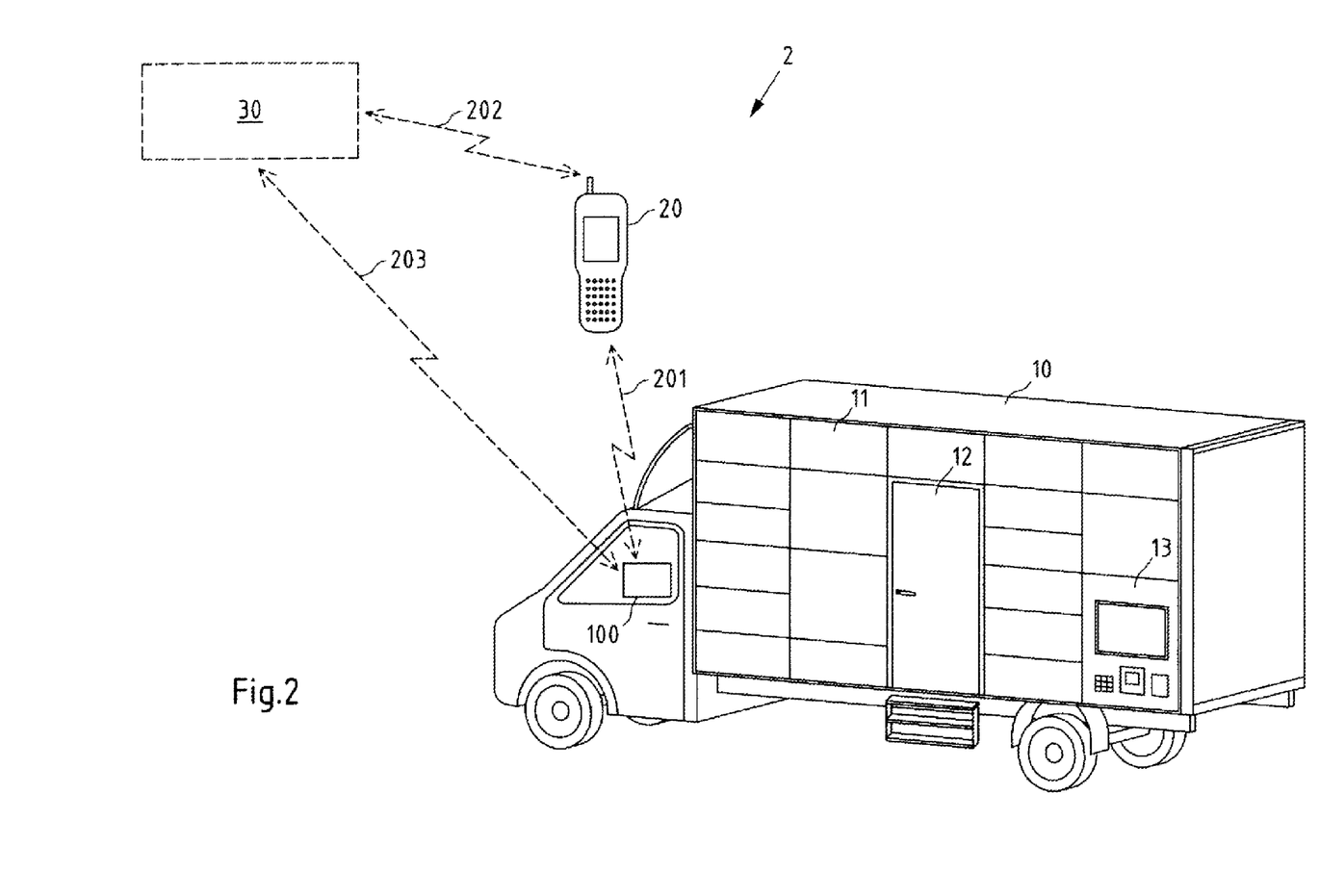
FIG. 2 shows an exemplary illustration of a system according to the invention having an exemplary embodiment of a vehicle according to the invention.

FIG. 2 is an exemplary illustration of a system 2 according to the invention having an exemplary embodiment of a vehicle 10 according to the invention. The system 2 comprises the vehicle 10, a mobile user apparatus 20 and optionally a courier service apparatus 30.

The vehicle 10 is a truck and comprises the control apparatus 100 according to the invention and a plurality of receiving compartments which are each closed by a door. One of the doors of the receiving compartments is provided with the reference symbol 11 in FIG. 2. This door 11 is comprises the door lock 106, for example. The vehicle 10 optionally further comprises a changing cubicle which is closed with the door 12 and/or a user terminal 13. Vehicle 10 is an at least partially autonomously driving vehicle. For example, the vehicle and/or means of the vehicle is/are configured to move the vehicle along a route predetermined by the navigation device 107 of the vehicle 10 in an at least partially autonomous manner, for example to drive the vehicle automatically (for example without the influence of a vehicle driver) on a part of the route predetermined by the navigation device 107 and to navigate (for example steer) the vehicle along the predetermined route.

The mobile user apparatus 20 is a mobile telephone, for example.

The control apparatus 100 and the mobile user apparatus 20 are connected to one another via the optional communication connection 201. It is assumed below, for example, that the communication connection 201 comprises a wireless communication connection via a local radio network. The mobile user apparatus 20 is configured in system 2, for example, to communicate with the communication interface 104 and/or the communication interface 108 via the communication connection 201, for example to transmit pieces of information (for example pieces of access authorization information, pieces of position information and/or pieces of time information) to the control apparatus 100 and/or to receive pieces of information from the control apparatus 100.

The optional courier service apparatus 30 is, for example, a server belonging to a courier service which monitors and/or supports and/or arranges and/or plans the proper sequence of one or more collections/deliveries, for example.

As disclosed above, the mobile user apparatus 20 in system 2 is connected to the control apparatus 100, for example via the optional communication connection 201. Alternatively or additionally, the mobile user apparatus 20 in system 2 is connected to the courier service apparatus 30 via the optional communication connection 202. It is assumed below, for example, that the communication connection 202 comprises a wireless communication connection via a mobile radio network. For example, the mobile user apparatus 20 can transmit pieces of information (for example pieces of access authorization information, pieces of position information and/or pieces of time information) and/or can receive pieces of information from the courier service apparatus 30 via the communication connection 202.

The courier service apparatus 30 in system 2 is furthermore connected to the control apparatus 100, for example via optional communication connection 203. The courier service apparatus 30 is configured in system 2, for example, to communicate with the communication interface 104 and/or the communication interface 108 via the communication connection 203, for example to transmit pieces of information (for example pieces of access authorization information, pieces of position information and/or pieces of time information) to the control apparatus 100 and/or to receive pieces of information from the control apparatus 100.

The communication connections 201, 202 and 203 are illustrated by way of example as wireless communication connections in FIG. 2. However, it is also possible, for example, for the communication connections 201, 202 and/or 203 not to comprise solely wireless communication connections; for example, at least one of the communication connections 201, 202 and/or 203 comprises at least one wired communication connection and at least one wireless communication connection.

FIG. 3 is a flowchart 300 which illustrates, for example, the steps of a method according to the invention. The steps illustrated in the flowchart 300 are performed and/or controlled, for example, by the control apparatus 100. For example, the steps are at least partially performed and/or controlled by the processor 101 of the control apparatus 100.

In a step 301, collection and/or delivery position information of a collection and/or delivery position for collecting and/or delivering a shipment is obtained at the control apparatus 100, wherein the collection and/or delivery position is at least partially dependent on a position of a shipment recipient and/or shipment deliverer. In this case, the position of the shipment recipient and/or shipment deliverer is intended to be understood as meaning, for example, the position of a mobile user apparatus belonging to the shipment recipient and/or shipment deliverer.

The collection and/or delivery position information comprises, for example, a position specification and/or position coordinates of the collection and/or delivery position.

For example, collection and/or delivery position information is received in step 301 by the communication means 104 and/or the communication means 108 and is therefore obtained at the control apparatus 100.

For example, the collection and/or delivery position information is communicated by the mobile user apparatus 20 to the control apparatus 100 via the communication connection 201. For example, the user can stipulate the current position of the mobile user apparatus 20 as a desired collection and/or delivery position by a corresponding input on the mobile user apparatus 20, with the result that the mobile user apparatus 20 determines corresponding collection and/or delivery position information based on the current position of the mobile user apparatus 20 and communicates it to the control apparatus 100 via the communication connection 201. The mobile user apparatus comprises, for example, positioning means, such as a sensor of a satellite navigation system, which are configured to determine the current position of the mobile user apparatus.

Alternatively or additionally, the collection and/or delivery position information is communicated from the courier service apparatus 30 to the control apparatus 100 via the communication connection 203. For example, the courier service apparatus 30 determines the collection and/or delivery position at least partially in dependence on position information (for example position information of a current position of the mobile user apparatus 20) received at the courier service apparatus 30 from the mobile user apparatus 20 via the communication connection 202. For example, the courier service apparatus 30 communicates collection and/or delivery position information of the determined collection and/or delivery position to the control apparatus 100 via the communication connection 201.

Furthermore, it is also possible, for example, for the control apparatus 100 to determine the collection and/or delivery position in step 301 at least partially in dependence on position information (for example position information of a current position of the mobile user apparatus 20) received at the control apparatus 100 from the mobile user apparatus 20 via the communication connection 201 and to obtain the collection and/or delivery position information as result of the determining.

Step 301 and/or the determining of the collection and/or delivery position at least partially in dependence on the position of the shipment recipient and/or shipment deliverer is/are performed again, for example, each time the position of the shipment recipient and/or shipment deliverer changes, for example when the position of the shipment recipient and/or shipment deliverer changes substantially. A substantial change in the position of the shipment recipient and/or shipment deliverer is present, for example, when the position of the shipment recipient and/or shipment deliverer changes by more than a predetermined distance, for example changes by more than 3 km, preferably more than 1 km, particularly preferably more than 500 m.

In a step 302, the control apparatus 100 causes the at least partially autonomous moving of the vehicle 10 to the collection and/or delivery position.

For example, in step 302, the control apparatus 100 actuates the navigation device 107 of the vehicle 10 via vehicle interface 105 in order to cause the collection and/or delivery position to be taken into account as the target position or intermediate target position on the route predetermined by the navigation device 107 of the vehicle 10 and to cause the vehicle 10 to move to the collection and/or delivery position in an at least partially autonomous manner.

In a step 303, the control apparatus 100 causes providing of the shipment for collection and/or of holding available for obtaining the shipment at the collection and/or delivery position by the vehicle 10.

For example, access authorization information is first of all obtained at the control apparatus 100 in step 303. For example, the access authorization information is obtained by the communication interface 104 or by the communication interface 108 and is forwarded to the processor 101. For example, the access authorization information was communicated from the mobile user apparatus 20 to the control apparatus 100 via the communication connection 201.

The access authorization information authorizes access for collecting and/or delivering the shipment, for example.

The unlocking of the door 11 of the vehicle 10 is then caused at least partially in dependence on the obtained access authorization information by the control apparatus 100. For example, the unlocking of the door 11 of the vehicle 10 is caused at least partially in response to the obtaining of the access authorization information.

For example, the processor 101 is configured to actuate the door lock 106 via vehicle interface 105 such that the door lock 106 is opened and the door 11 of the vehicle 10 is unlocked, with the result that the door 11 of the vehicle 10 can be opened by the shipment recipient and/or shipment deliverer. After opening the door 11, the shipment recipient can remove, for example, a shipment which is situated in the receiving compartment and is intended for the shipment recipient from the receiving compartment in order to conclude the collection. In contrast, the shipment deliverer can insert the shipment to be delivered into the receiving compartment in order to conclude the delivery.

Steps 302 and 303 are performed again, for example, each time (for example different) collection and/or delivery position information is obtained in step 301.

The exemplary embodiments of the present invention which are described in this specification are also intended to be understood as having been disclosed in all combinations with one another. In particular, the description of a feature included in one embodiment—unless explicitly stated to the contrary—is also not intended to be understood in the present case as meaning that the feature is indispensable or essential to the function of the exemplary embodiment. The sequence of the method steps described in this specification in the individual flowcharts is not obligatory and alternative sequences of the method steps are conceivable. The method steps can be implemented in various ways, and so an implementation in software (by program instructions), hardware or a combination of both is conceivable for implementing the method steps.

Terms such as "comprise", "have", "include", "contain" and the like used in the patent claims do not exclude further elements or steps. The wording "at least partially" includes both the case of "partially" and the case of "completely". The wording "and/or" is intended to be understood as meaning that both the alternative and the combination are intended to have been disclosed, that is to say "A and/or B" means "(A) or (B) or (A and B)". A plurality of units, persons or the like means multiple units, persons or the like in connection with this specification. The use of the indefinite article does not exclude a plurality. An individual device may perform the functions of a plurality of units or devices mentioned in the patent claims. Reference symbols stated in the patent claims should not be considered as restrictions of the means and steps used.

The invention claimed is:

1. A method comprising:
obtaining, at a control apparatus of a land vehicle, collection and/or delivery position information of a collection or delivery position for collecting or delivering a shipment, wherein the collection or delivery position is at least partially dependent on (i) a current position of a shipment recipient or shipment deliverer as obtained at regular and/or irregular intervals from a mobile apparatus of the shipment recipient or shipment deliverer and (ii) at least one position of at least one further shipment recipient or shipment deliverer as obtained at regular and/or irregular intervals from at least one further mobile apparatus of the at least one further shipment recipient or shipment deliverer, wherein the collection or delivery position is within a shortest possible or predetermined distance from each of (i) the current position of the shipment recipient or shipment deliverer and (ii) the at least one position of the at least one further shipment recipient or shipment deliverer such that the collection or delivery position is in a radius of less than 3 km around the current position of the shipment recipient or shipment deliverer, wherein the current position of the shipment recipient or shipment deliverer is the position of the mobile apparatus belonging to the shipment recipient or shipment deliverer and wherein the at least one position of the at least one further shipment recipient or shipment deliverer is the position of the at least one further mobile apparatus of the at least one further shipment recipient or shipment deliverer;

obtaining, at the control apparatus, collection or delivery time information for collecting or delivering the shipment, wherein the collection or delivery time information comprises at least one of collection or delivery period information or collection or delivery date information for collecting or delivering the shipment;

causing, by the control apparatus, of at least partially autonomous moving of the land vehicle to the collection or delivery position at least partially in dependence on the obtained collection or delivery time information; and causing, by the control apparatus, of providing of the shipment for collection or of holding available for obtaining the shipment at the collection or delivery position by the land vehicle, comprising:

obtaining, at the control apparatus, access authorization information, and causing, by the control apparatus, of unlocking of a door of the land vehicle at least partially in dependence on the obtained access authorization information.

2. The method according to claim 1, the method further comprising:

determining the collection or delivery position at least partially in dependence on the current position of the shipment recipient or shipment deliverer, wherein the collection or delivery position information of the collection or delivery position is obtained as result of the determining.

3. The method according to claim 2, wherein the collection or delivery position is a road position.

4. The method according to claim 2, wherein the collection or delivery position is at least partially determined again in dependence on the current position of the shipment recipient or shipment deliverer at least if the position of the shipment recipient or shipment deliverer changes substantially.

5. The method according to claim 1, wherein the control apparatus causes the land vehicle to at least partially autonomous moving to the collection or delivery position such that it is at the collection or delivery position at the collection or delivery date or is at least temporarily at the collection or delivery position in the collection or delivery period.

6. The method according to claim 1, the method further comprising:

notifying or causing of notifying of the shipment recipient or shipment deliverer when the land vehicle is at the collection or delivery position.

7. The method according to claim 1, the obtaining access authorization information comprising:

capturing a user input by the shipment recipient or shipment deliverer on user input means, and/or receiving the access authorization information at the control apparatus.

8. The method according to claim 1, the causing of the providing of the shipment or of the obtaining of the shipment further comprising:

deciding whether access is grantable for collecting the shipment or delivering the shipment at least partially in dependence on the obtained access authorization information, and causing of unlocking of the door of the land vehicle only when it has been decided that access is grantable.

9. The method according to claim 1, wherein the access authorization information authorizes access for collecting the shipment or delivering the shipment.

10. The method according to claim 1, wherein the land vehicle comprises at least one of one or more receiving compartments for receiving one or more shipments or one or more cubicles or one or more user terminals.

11. The method according to claim 1, wherein the land vehicle is an autonomously driving land vehicle.

12. A control apparatus for a land vehicle comprising at least one processor and at least one memory which contains program code, wherein the memory and the program code are configured to cause the control apparatus with the at least one processor to perform:

obtaining collection or delivery position information of a collection or delivery position for collecting or delivering a shipment, wherein the collection or delivery position is at least partially dependent on (i) a current position of a shipment recipient or shipment deliverer as obtained at regular and/or irregular intervals from a mobile apparatus of the shipment recipient or shipment deliverer and (ii) at least one position of at least one further shipment recipient or shipment deliverer as obtained at regular and/or irregular intervals from at least one further mobile apparatus of the at least one further shipment recipient or shipment deliverer, wherein the collection or delivery position is a position within a shortest possible or predetermined distance from each of (i) the current position of the shipment recipient or shipment deliverer and (ii) the at least one position of the at least one further shipment recipient or shipment deliverer such that the collection or delivery position is in a radius of less than 3 km around the current position of the shipment recipient or shipment deliverer, wherein the current position of the shipment recipient or shipment deliverer is the position of the mobile apparatus belonging to the shipment recipient or shipment deliverer and wherein the at least one position of the at least one further shipment recipient or shipment deliverer is the position of the at least one further mobile apparatus of the at least one further shipment recipient or shipment deliverer;

obtaining collection or delivery time information for collecting or delivering the shipment, wherein the collection or delivery time information comprises at least one of collection or delivery period information or collection or delivery date information for collecting or delivering the shipment;

causing of at least partially autonomous moving of the land vehicle to the collection or delivery position at least partially in dependence on the obtained collection or delivery time information; and causing of providing of the shipment for collection or of holding available for obtaining the shipment at the collection or delivery position by the land vehicle, comprising:

obtaining access authorization information, and causing of unlocking of a door of the land vehicle at least partially in dependence on the obtained access authorization information.

13. The control apparatus according to claim 12, wherein the memory and the program code are further configured to cause the control apparatus with the at least one processor to perform:

determining the collection or delivery position at least partially in dependence on the current position of the shipment recipient or shipment deliverer, wherein the collection or delivery position information of the collection or delivery position is obtained as result of the determining.

14. The control according to claim 12, wherein the collection or delivery position is a road position.

15. The control apparatus according to claim 13, wherein the collection or delivery position is at least partially determined again in dependence on the position of the shipment recipient or shipment deliverer at least if the current position of the shipment recipient or shipment deliverer changes substantially.

16. The control apparatus according to claim 12, wherein the control apparatus causes the land vehicle to at least partially autonomous moving to the collection or delivery position such that it is at the collection or delivery position at the collection or delivery date or is at least temporarily at the collection or delivery position in the collection or delivery period.

17. The control apparatus according to claim 12, wherein the memory and the program code are further configured to cause the control apparatus with the at least one processor to perform:

notifying or causing of notifying of the shipment recipient or shipment deliverer when the land vehicle is at the collection or delivery position.

18. The control apparatus according to claim 12, the obtaining access authorization information comprising:

capturing a user input by the shipment recipient or shipment deliverer on user input means, and/or receiving the access authorization information.

19. The control apparatus according to claim 12, the causing of the providing of the shipment or of the obtaining of the shipment further comprising:

deciding whether access is grantable for collecting the shipment or delivering the shipment at least partially in dependence on the obtained access authorization information, and causing of unlocking of the door of the land vehicle only when it has been decided that access is grantable.

20. The control apparatus according to claim 12, wherein the access authorization information authorizes access for collecting the shipment or delivering the shipment.

21. The control apparatus according to claim 12, wherein the land vehicle comprises at least one of one or more receiving compartments for receiving one or more shipments or one or more cubicles or one or more user terminals.

22. The control apparatus according to claim 12, wherein the land vehicle is an autonomously driving land vehicle.

23. A non-transitory computer-readable storage medium containing program code, wherein the program code comprises instructions for:

obtaining, at a control apparatus of a land vehicle, collection or delivery position information of a collection or delivery position for collecting or delivering a shipment, wherein the collection or delivery position is at least partially dependent on (i) a current position of a shipment recipient or shipment deliverer as obtained at regular and/or irregular intervals from a mobile apparatus of the shipment recipient or shipment deliverer and (ii) at least one position of at least one further shipment recipient or shipment deliverer as obtained at regular and/or irregular intervals from at least one further mobile apparatus of the at least one further shipment recipient or shipment deliverer, wherein the collection or delivery position is within a shortest possible or predetermined distance from the current position of the shipment recipient or shipment deliverer and (ii) the at least one position of the at least one further shipment recipient or shipment deliverer such that the collection or delivery position is in a radius of less than 3 km around the current position of the shipment recipient or shipment deliverer, wherein the current position of the shipment recipient or shipment deliverer is the position of the mobile apparatus belonging to the shipment recipient or shipment deliverer and wherein the at least one position of the at least one further shipment recipient or shipment deliverer is the position of the at least one further mobile apparatus of the at least one further shipment recipient or shipment deliverer;

obtaining, at the control apparatus, collection or delivery time information for collecting or delivering the shipment, wherein the collection or delivery time information comprises at least one of collection or delivery period information or collection or delivery date information for collecting or delivering the shipment;

causing, by the control apparatus, of at least partially autonomous moving of the land vehicle to the collection or delivery position at least partially in dependence on the obtained collection or delivery time information; and causing, by the control apparatus, of providing of the shipment for collection or of holding available for obtaining the shipment at the collection or delivery position by the land vehicle, comprising:

obtaining, at the control apparatus, access authorization information, and causing, by the control apparatus, of unlocking of a door of the land vehicle at least partially in dependence on the obtained access authorization information.

\* \* \* \* \*